United States Patent [19]
Barnhart et al.

[11] 3,800,051
[45] Mar. 26, 1974

[54] REDUCING SERUM CHOLESTEROL WITH CERTAIN SUBSTITUTED PHENOLS

[75] Inventors: James W. Barnhart, Indianapolis; Philip J. Shea, Zionsville, both of Ind.

[73] Assignee: The Dow Chemical Company, Midland, Mich.

[22] Filed: Sept. 21, 1970

[21] Appl. No.: 74,155

[52] U.S. Cl................ 424/346, 424/330, 424/340, 424/347
[51] Int. Cl............................................ A61k 27/00
[58] Field of Search......... 260/624 R; 424/346, 340, 424/330

[56] References Cited
UNITED STATES PATENTS

| | | | |
|---|---|---|---|
| 2,721,804 | 10/1955 | Rosenwald | 260/624 R X |
| 2,726,270 | 12/1955 | Bryner | 260/624 R |
| 2,733,274 | 1/1956 | Cowie | 260/624 R |
| 2,842,595 | 7/1958 | Rigterink | 260/624 R X |
| 2,955,037 | 10/1960 | Smith | 260/624 R X |
| 3,219,701 | 11/1965 | O'Shea | 260/569 |
| 3,281,506 | 10/1966 | Shepard et al. | 260/624 R X |
| 3,418,379 | 12/1968 | Parsey et al. | 260/624 R |
| 3,470,259 | 9/1969 | Leston | 260/624 R X |
| 3,491,044 | 1/1970 | Meier et al. | 260/624 R X |
| 3,491,102 | 1/1970 | O'Shea et al. | 260/624 R X |

OTHER PUBLICATIONS

Chemical Abstracts I, 54: 7609h, (1960).
Chemical Abstracts II, 60: P13186b, (1964).
Chemical Abstracts III, 64: 19462gh, (1966).

Primary Examiner—Albert T. Meyers
Assistant Examiner—Vera C. Clarke
Attorney, Agent, or Firm—Griswold and Burdick; C. K. Bjork

[57] ABSTRACT

Methods useful for lowering serum cholesterol in animals comprising administration to the animal of a hypocholesteremic amount of a substituted phenol, and compositions to be employed in practicing the method.

5 Claims, No Drawings

REDUCING SERUM CHOLESTEROL WITH CERTAIN SUBSTITUTED PHENOLS

SUMMARY OF THE INVENTION

The present invention is directed to novel compositions and methods for using the same for reducing the concentration of cholesterol in the blood of animals. More particularly, the invention is directed to novel pharmaceutical compositions and methods for using the same to reduce cholesterol levels in the blood of vertebrate animals wherein the compositions contain a hypocholesteremic amount of a substituted phenol compound.

It is an object of this invention to provide novel pharmaceutical compositions which have the effect of lowering blood cholesterol upon the administration of such compositions to animals. A further object of this invention is to provide a novel method for lowering blood cholesterol in animals. A further object of this invention is to provide novel compositions which have the effect of lowering serum cholesterol in warm-blooded animals and which have low toxicity and little or no pharmacological effects in other areas at dosage levels consistent with good hypocholesteremic, hypocholesterolemic or cholesterol-lowering activity. It is a further object of this invention to provide novel compositions which have the effect of lowering blood cholesterol in animals. A further object of the invention is to provide a method and compositions useful for the alleviation of hypercholesteremia in mammals.

It has been found that the serum cholesterol level of warm-blooded animals may be lowered by administering to an animal a hypocholesteremic amount of a substituted phenol compound corresponding to the formula:

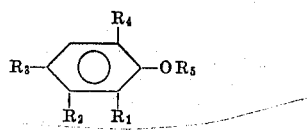

wherein $R_1$ represents a member of the group consisting of hydrogen, phenyl, α-methylbenzyl, 2,3-dichloro-α-α-dimethylbenzyl, sec.-amyl, (dimethylamino)-methyl, cyclohexyl, 2-cyclohexylcyclohexyl, sec.-butyl, chlorine, bromine, α-cyclohexylamino, tert.-butyl, isobornyl, 1,1,3,3-tetramethylbutyl, 1,1-dimethylbutyl, tert.-pentyl and cyclopentyl; $R_2$ is methyl or hydrogen; $R_3$ represents a member of the group consisting of tert.-octyl, α-methylbenzyl, tert.-butyl, hexyl, sec.-amyl, sec.-butyl, methyl, isopropyl, cyclohexyl, tert.-pentyl, chlorine, 1,1,3,3-tetramethylbutyl, phenyl and cyclopentyl; $R_4$ represents a member selected from the group consisting of hydrogen, α-methylbenzyl, hexyl, sec.-butyl, tert.-butyl, cyclohexyl, sec.-amyl, benzyl, isobornyl, tert.-pentyl and cyclopentyl; and $R_5$ represents hydrogen or methyl; or of a suitable composition or dosage form containing as the active ingredient thereof a hypocholesteremic amount of at least one such compound. Preferred of these compounds are the substituted phenols wherein, in the above formula, $R_5$ represents hydrogen. The compounds are crystalline solids which are of low solubility in water and somewhat soluble in many organic solvents.

It has been found that the substituted phenol compounds employed in accordance with the invention, when administered internally to animals and in particular to mammals in a hypocholesteremic amount have the effect of lowering the blood cholesterol content, that is, the amount of cholesterol in the blood serum of the animal. The substituted phenol compounds have also been found to bring about a substantial lowering of serum cholesterol when administered orally to animals in the form of orally-ingestible compositions. The substituted phenol compounds have low toxicity and have little or no pharmacological effects in other areas at dosage levels consistent with good hypocholesteremic or cholesterol-lowering activity.

The administration of a hypocholesteremic amount of a substituted phenol compound to an animal is critical and essential to the practice of the method of the invention. A hypocholesteremic amount of a substituted phenol compound is that amount which effectuates a substantial reduction of serum cholesterol levels in the animal administered the compound. Whether or not sufficient of a substituted phenol compound is administered under particular circumstances can be ascertained by the conventional procedure of measuring serum cholesterol levels of animals administered the compound and comparing the results with the cholesterol levels observed in similar untreated animals. Whether or not a reduction is regarded as substantial depends on a variety of factors such as the result desired, the species of animal and variations in cholesterol levels occurring when no compound is administered. Generally, decreases of from about 10 percent to about 70 percent or more of the control cholesterol levels indicate a substantial reduction of serum cholesterol obtained by the use of the invention.

The hypocholesteremic amount of the substituted phenol compounds to be administered to an animal, that is, the amount which is effective to substantially lower the serum cholesterol level, can vary depending upon such factors as the size, weight and age of the animal treated, the particular phenols employed, the desired serum cholesterol level to be obtained, whether or not the animal is hypercholesteremic (e.g., whether or not the original cholesterol level is above normal), the period of administration and the method of administration. The compounds can be administered in a hypocholesteremic amount of from about 1 milligram to about 5 grams per kilogram. They can be administered orally in single doses or repeated multiple doses; if desired, injectable compositions comprising the substituted phenol compounds may be utilized for intraperitoneal injection. In general, the substituted phenol compounds are administered in daily oral dosages of from about 1 to about 5 milligrams to about 1,000 milligrams of the active compound per kilogram of body weight of the animal to be treated.

The substituted phenol compounds are preferably administered as compositions in dosage unit form. Such compositions can be prepared by known techniques and preferably contain from about 100 milligrams to about 5 grams of the active compound. The compounds can also be administered as compositions adapted to be fed as part or all of the animal diet.

In forming the compositions of the invention, the active phenol compound is incorporated in a non-toxic carrier. In the present specification and claims, the term "non-toxic carrier" refers to conventional excipients and includes nutritive compositions such as a solid or liquid foodstuff. In the present specification and claims, the term "foodstuff" refers to non-toxic carriers which are not only non-toxic and non-sensitizing, but which are also digestible and otherwise utilizable in the animal metabolism. In the present specification and claims, the term "excipient" refers to known pharmaceutical excipients which are substantially non-toxic, non-sensitizing and without significant pharmacological activity when compositions of the invention are administered at dosages consistent with good hypocholesteremic activity. Certain non-toxic carriers such as starch are both foodstuffs and pharmaceutical excipients. In the composition of the invention, the non-toxic carrier employed cooperates with the active ingredient to prepare a desirable composition for administration and to release and disperse a hypocholesteremic amount of the active substituted phenol within the animal body after administration. Particular non-toxic carriers can be selected by conventional procedures to prepare compositions which can vary somewhat in physical form, oral acceptance by animals (palatability), onset and duration of hypocholesteremic activity and the like. The selection of particular non-toxic carriers to be employed in particular situations or for particular routes of administration is well known to those skilled in the formulation of orally ingestible as well as injectable compositions. Preferred compositions are those in which the non-toxic carrier is selected from the group consisting of inert solid diluents, suspending agents and surface-active dispersing agents. Particularly preferred are the above compositions wherein the non-toxic carrier further comprises a solid or liquid foodstuff which can include a water-soluble vitamin.

A preferred composition comprises a finely divided inert solid pharmaceutical excipient in intimate admixture with from about 10 to about 95 percent of a substituted phenol compound. The term "finely divided inert solid pharmaceutical excipient" refers to solid, non-toxic, physiologically inert or undigestible pharmaceutical carriers having a particle size small enough to pass a screen having 12 meshes to the inch. Representative finely divided inert solids which can be employed include silica gel or silica, chalk, magnesium carbonate, magnesium stearate, talc, calcium sulfate, cellulose, microcrystalline cellulose and the like. In such compositions, the excipient cooperates with the active ingredient to facilitate the action thereof and disperse the same internally of the animal organism upon oral administration of the composition. Such compositions can also be employed as concentrates for admixture with and dispersal of the active ingredient throughout the ultimate composition.

Another preferred composition comprises an intimate admixture of the active phenol compound with a suspending agent and, optionally, a surface-active dispersing agent. The composition can also include one or more of a water-soluble vitamin, a water-soluble or water-dispersible flavor and a water-soluble or water-dispersible foodstuff. By "suspending agent" is meant the conventional non-toxic pharmaceutical excipients employed in the preparation of aqueous suspensions adapted for administration to animals orally or by injection. The solid suspending agents are preferred. Representative suspending agents which can be employed include carboxymethyl cellulose, methyl cellulose, hydroxyethyl cellulose, ethyl cellulose, hydroxypropylmethyl cellulose, hydroxypropyl cellulose, pectin, carrageenin, alginic acid, sodium alginate, guar gum, gum acacia, gum tragacanth and the like. By "surface-active dispersing agents" is meant conventional non-toxic surfactants, wetting agents or emulsifying agents employed in the preparation of aqueous dispersions or emulsions adapted for oral administration to animals. Representative surface-active dispersing agents which can be employed include naturally-occurring phosphatides, for example, lecithin; natural gums, for example, gum acacia and gum tragacanth; synthetic sugar ester emulsifiers such as sucrose mono-, di- and tristearate, sorbitan derivatives such as sorbitan trioleate and polyoxyethylene sorbitan monooleate and the like, polyoxyethylene condensation products of alkyl phenols, fatty acids and fatty alcohols and the like and compatible mixtures of the same. The suspending agents and the surface-active agent, whether employed separately or in combination, cooperate with the active ingredient to facilitate absorption of the active phenol in the animal organism to enhance the hypocholesteremic results obtained by administration of the compositions and to aid in the preparation of compositions having improved properties such as palatability for administration per os or viscosity for administration by injection. Such compositions will generally contain from about 10 to about 95 parts by weight of the active substituted phenol compound and from about 90 to about 5 parts by weight of the suspending agent, surface-active dispersing agent or mixture thereof.

The substituted phenols can be administered in solid compositions which can be prepared by conventional procedures such as tableting or encapsulation. The solid compositions can include non-toxic carriers such as starch, lactose, glucose, sucrose, gelatin, gum acacia, gum tragacanth, chalk, magnesium carbonate, magnesium stearate, powdered licorice, malt and other like excipients, and compatible mixtures thereof. The tablet formulations can be uncoated or they can be coated with conventional coating materials such as shellac. The solid compositions can contain from about 10 to about 95 percent, and preferably from 50 to 95 percent of the active phenol compound.

The substituted phenols can also be formulated as oil-in-water or water-in-oil emulsions wherein the oil phase comprises a solution of the active compound in an oil such as corn oil, peanut oil, olive oil, sunflower seed oil or the like, or compatible mixtures thereof. Emulsions are prepared with the aid of emulsifying agents such as naturally-occurring phosphatides, for example, lecithin or natural gums, such as, gum acacia and gum tragacanth, and synthetic emulsifiers such as sorbitan trioleate and polyoxyethylene sorbitan monooleate.

The substituted phenols can also be formulated as suspensions which are prepared with the aid of wetting agents such as polyoxyethylene condensation products of alkylphenols, fatty acids and fatty alcohols and suspending agents such as methylene cellulose, carboxymethyl cellulose and hydroxypropylmethyl cellulose and the like.

In the liquid compositions such as elixirs and syrups and including suspensions and emulsions, other non-toxic liquid carriers can be utilized such as ethanol, water, saline, propylene glycol, polyethylene glycols, glycerine, syrup of acacia, mucilage of tragacanth, glucose syrup and other like excipients and compatible mixtures thereof. The liquid compositions generally contain from about 10 to about 95 percent of the active substituted phenol compound.

The compositions described above can also contain, in addition, sweetening agents such as sugar or saccharin, flavoring agents such as caramel, preservatives such as ethyl p-hydroxybenzoate, antioxidants such as ascorbic acid and suitable coloring materials.

The active substituted phenol compounds can also be incorporated in a foodstuff such as, for example, butter, margarine, edible oils and the like. The phenol compounds can also be prepared in the form of a nutritive composition in which the active compound is mixed with vitamins, fats, proteins or carbohydrates and the like, or mixtures thereof. Such compositions can be prepared in liquid form such as emulsions or suspensions, as well as in solid form. The nutritive compositions are adapted to be administered as the total diet, as a part of the diet or as a supplement to the diet. The nutritive compositions preferably contain from about 0.02 to about 2 percent of the active compound when administered as the total diet. The compositions can contain higher concentrations such as from 2 to 25 percent of the active phenol compound when administered as a supplement.

The substituted phenol compounds of the present invention can also be formulated as concentrated compositions which are adapted to be diluted by admixture with liquid or solid food stuffs. The concentrated compositions are preferably prepared by mechanically milling or otherwise mixing the active phenol compound with a finely divided inert solid carrier such as silica gel, talc, chalk or the like or a finely divided foodstuff such as casein, sugar or the like, or mixtures thereof. The concentrated compositions can also include additional ingredients such as water-soluble vitamins, fat-soluble vitamins, proteins, amino acids, carbohydrates and the like.

DESCRIPTION OF THE PREFERRED EMBODIMENTS

The following examples illustrate the present invention but are not to be construed as limiting.

Example 1

Separate solutions containing one part of one of the substituted phenol compounds dissolved in 4 parts of acetone are prepared and mixed with 3 parts of silica gel to absorb the substituted phenol compound on the silica gel. The mixture is dried to obtain a concentrated composition containing 25 percent of the active phenol compound. Portions of each of the concentrate compositions are employed to prepare separate nutritive compositions by intimately mixing 0.5 part of the concentrated composition with 99.5 parts of standard animal feed on a conventional roller mill. There is thus obtained a nutritive composition suitable for oral administration to animals for the purpose of lowering serum cholesterol levels. The composition is adapted to be fed as the entire animal diet.

Example 2

In substantially the same procedure as described above in Example 1, separate portions of balanced rodent mash are mixed together to prepare a series of separate compositions each containing 0.12 percent by weight of a representative substituted phenol compound. Separate groups of male mice of the same origin and past history were fed for two weeks on separate diets consisting of one of the above-described compositions. A separate group of check mice was similarly fed for two weeks on a similar diet which contained none of a substituted phenol compound to serve as a check. At the end of the two week period, the mice were exsanguinated under ether anesthesia. Serum cholesterol was determined by taking a 0.05 milliliter aliquot of serum from each mouse and adding the aliquot to 3 milliliters of a 0.08 percent solution of ferric chloride in pure acetic acid. The serum was mixed with the ferric chloride-acetic acid solution and allowed to stand for 10 to 15 minutes to flocculate protein. The protein was precipitated by centrifugation and the clear supernatant was transferred to a stoppered test tube. Two milliliters of sulfuric acid were added to the supernatant and mixed well. The tubes were then left to stand exposed to air for 20 to 30 minutes. Serum cholesterol was determined by measuring percent transmission at a wave length of 560 millimicrons in a spectrophotometer and comparing the percent transmission to that observed with solutions containing known amounts of cholesterol. The serum cholesterol level found in the check group of mice was used as the basis for calculating percentage reduction of cholesterol. The percentage reduction of cholesterol for the particular substituted phenol compounds employed at the dosage rate of 0.12 percent of the diet are set forth in the following table.

TABLE I

| Compound No. | Substituted Phenol Percent Reduction of Cholesterol |
|---|---|
| 1. 2-hydroxy-5-tert.-octyl diphenyl | 18 |
| 2. 2,4,6-tris($\alpha$-methylbenzyl)phenol | 13 |
| 3. 4-tert-butyl-2-(2,3(and 3,4)dichloro-$\alpha$,$\alpha$-dimethylbenzyl)phenol | 42 |
| 4. 4-tert-butyl-2-($\alpha$,$\alpha$-dimethylbenzyl)phenol | 49 |
| 5. 4,6-dihexyl-m-cresol | 35 |
| 6. 2,4-di-sec-amylphenol | 27 |
| 7. 4,6-di-sec-butyl-$\alpha$-(dimethylamino)-o-cresol | 20 |
| 8. 2-(2-cyclohexylcyclohexyl)-p-cresol | 28 |
| 9. 2,6-dicyclohexyl-4-isopropylphenol | 17 |
| 10. 2-bromo-4,6-di-sec-butylphenol | 30 |
| 11. 2,4-di-sec-butylphenol | 32 |
| 12. 2,4-di-sec-amyl-6-chlorophenol | 32 |
| 13. 4-sec-butyl-2,6-dicyclohexylphenol | 26 |
| 14. 4-sec-butyl-2-cyclohexylphenol | 44 |
| 15. 2,4-dicyclohexylphenol | 23 |
| 16. 4-sec-amyl-2-cyclohexylphenol | 48 |
| 17. 4-sec-amyl-2,6-dicyclohexylphenol | 32 |
| 18. 4,6-di-tert-butyl-$\alpha$-cyclohexylamino-o-cresol | 26 |
| 19. $\alpha$-cyclohexylamino-4-(1,1-dimethylpropyl)-o-cresol | 15 |
| 20. 4-chloro-$\alpha^2$-dimethyl-amino-$\alpha^6$-phenyl-2,6-xylenol | 28 |
| 21. 4-sec-butyl-2-tert-butylphenol | 50 |
| 22. 4-sec-butyl-2-isobornylphenol | 15 |
| 23. 2,6-diisobornyl-4-isopropylphenol | 21 |
| 24. 2,4-bis(1,1,3,3-tetramethylbutyl)phenol | 55 |
| 25. 4-sec-butyl-2-(1,1-dimethylbutyl)phenol | 68 |
| 26. 4-sec-butyl-2,6-bis-(1,1,3,3-tetramethylbutyl)phenol | 25 |
| 27. 4-isopropyl-2-(1,1,3,3-tetramethylbutyl)phenol | 32 |
| 28. 2,4-diphenylphenol | 14 |
| 29. 4-sec-butyl-2-($\alpha$-methylbenzyl)phenol | 14 |
| 30. 4-sec-butyl-2,6-bis($\alpha$-methylbenzyl)phenol | 43 |
| 31. 2,4,6-tri-tert-pentylphenol | 13 |
| 32. 2-chloro-4,6-dicyclopentylphenol | 56 |
| 33. 2,4-dicyclopentylphenol | 26 |
| 34. 2,4,6-tricyclopentylphenol | 35 |
| 35. 2,4-di-sec-butyl-anisole | 41 |

Example 3

Fifty parts of one of the substituted phenol compounds is intimately mixed with two parts of ascorbic acid and 48 parts of corn starch by using conventional mixing apparatus. The mixture is then filled into gelatin capsules in the amount of one gram per capsule and the capsules are administered to animals to bring about the reductions in serum cholesterol levels.

Example 4

A mixture consisting of 250 parts of one of the substituted phenol compounds and 8 parts of wheat starch and 6 parts of gelatin in 75 parts of water. The mixture is granulated, passed through an 8 mesh screen and dried. The granulate is then passed through a 12 mesh screen and mixed well with 13 parts of talc and 4 parts of magnesium stearate. The resulting mixture is compressed into tablets weighing 6 grams each. The tablets are scored by known methods and are adapted to be administered orally as a single dosage or as multiple dosages, each comprising one-half or one-fourth of a single tablet.

The substituted phenol compounds employed in the compositions and methods of the present invention are known and can be prepared by conventional methods or readily obtained from commercial sources.

What is claimed is:

1. A method useful for lowering serum cholesterol in hypercholesteremic animals which comprises orally administering to said animals or injecting said animals with a hypocholesteremic amount of a substituted phenol compound corresponding to the formula:

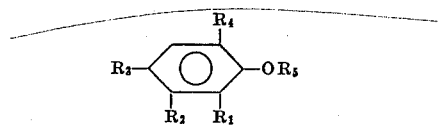

wherein $R_1$ is hydrogen, phenyl, $\alpha$-methylbenzyl, 2,3-dichloro-$\alpha$-$\alpha$-dimethylbenzyl, sec.-amyl, (dimethylamino)methyl, cyclohexyl, 2-cyclohexylamino, tert.-butyl, isobornyl, 1,1,3,3-tetramethylbutyl, 1,1-dimethylbutyl, tert.-pentyl or cyclopentyl; $R_2$ is methyl or hydrogen; $R_3$ is tert.-octyl, $\alpha$-methylbenzyl, tert.-butyl, hexyl, sec.-amyl, sec.-butyl, methyl, isopropyl, cyclohexyl, tert.-pentyl, chlorine, 1,1,3,3-tetramethylbutyl, phenyl or cyclopentyl; $R_4$ is hydrogen, $\alpha$-methylbenzyl, hexyl, sec.-butyl, tert.-butyl, cyclohexyl, sec.-amyl, benzyl, isobornyl, tert.-pentyl or cyclopentyl; and $R_5$ is methyl or hydrogen.

2. The method of claim 1 which comprises administering to the animal a daily dosage of between about 1.0 milligram and about 5 grams of the compound per kilogram of animal body weight.

3. The method of claim 1 wherein the substituted phenol compound is selected from the group consisting of 4,6-dihexyl-m-cresol; 4-sec-butyl-2-cyclohexylphenol; 4-sec-amyl-2-cyclohexylphenol; 2,4-di-sec.-butyl-anisole; 4-sec-butyl-2-tert-butylphenol; 2,4-bis(1,1,3,3-tetramethylbutyl)phenol; 4-sec-butyl-2-(1,1-dimethylbutyl)phenol; 4-sec-butyl-2,6-bis($\alpha$-methylbenzyl)phenol; 2-chloro-4,6-dicyclopentylphenol and 2,4,6-tricyclopentylphenol.

4. The method of claim 1 wherein the substituted phenol compound is 4-sec-butyl-2-(1,1-dimethylbutyl)phenol.

5. The method of claim 1 wherein the compound is administered orally.

* * * * *